United States Patent [19]

Dürselen et al.

[11] Patent Number: 5,062,925
[45] Date of Patent: Nov. 5, 1991

[54] METHOD OF REDUCING THE NITROGEN DIOXIDE CONTENT OF FLUE GAS FROM A COKE OVEN WITH DUAL HEATING FLUES BY A COMBINATION OF EXTERNAL FLUE GAS FEED BACK AND INTERNAL FLUE GAS RECIRCULATION

[75] Inventors: Heinz Dürselen, Velbert; Arnulf Schüffler; Günter Meyer, both of Essen, all of Fed. Rep. of Germany

[73] Assignee: Krupp Koppers GmbH, Essen, Fed. Rep. of Germany

[21] Appl. No.: 445,748

[22] Filed: Dec. 4, 1989

[30] Foreign Application Priority Data

Dec. 10, 1988 [DE] Fed. Rep. of Germany ....... 3841630

[51] Int. Cl.$^5$ .............................................. C10B 21/18
[52] U.S. Cl. ...................................... 201/41; 202/141; 202/142; 202/151
[58] Field of Search ............................ 201/41, 15, 26; 202/139, 142, 141, 151

[56] References Cited

U.S. PATENT DOCUMENTS

| | | | |
|---|---|---|---|
| 1,993,574 | 3/1935 | Totzek | 202/151 |
| 2,746,913 | 5/1956 | Schurhoff | 202/151 |
| 3,047,474 | 7/1962 | Tucker | 202/151 |
| 3,345,051 | 10/1967 | Ackeren | 202/139 |
| 3,389,156 | 10/1974 | Jakobi et al. | 201/41 |
| 4,102,751 | 7/1978 | Stalherm et al. | 202/151 |
| 4,141,797 | 2/1979 | Pries et al. | 201/41 |
| 4,574,034 | 3/1986 | Lemke et al. | 201/41 |

Primary Examiner—Joye L. Woodard
Attorney, Agent, or Firm—Michael J. Striker

[57] ABSTRACT

The method of reducing a nitrogen oxides content of a flue gas generated on firing of a rich gas or combination coke oven having a plurality of heating walls forming dual heating flues, in which a single stage or multistage combustion takes place, and also having a plurality of regenerators for recovery of flue gas heat and preheating of an underfiring medium, includes the steps of mixing one portion of the flue gas drawn from one flue of the dual heating flues with the underfiring medium, gas and/or air, prior to or on admission to the other flue of the dual heating flues, or a regenerator connected with it, and circulating another portion of the flue gas additionally inside the dual heating flues. The method advantageously also may include recirculating externally at a predetermined flow rate the one portion of the flue gas considering the recirculating of the other portion of the flue gas inside the dual heating flues and controlling the recirculating so that a flame temperature in the heating flues is kept constant based on a heat balance in the heating flues, and feeding, during rich gas firing of the combination coke oven, the one portion of the flue gas recirculated externally only to those of the regenerators, which receive the underfiring media during lean gas operation, and, during rich gas operation, only to every second one of the regenerators.

5 Claims, 1 Drawing Sheet

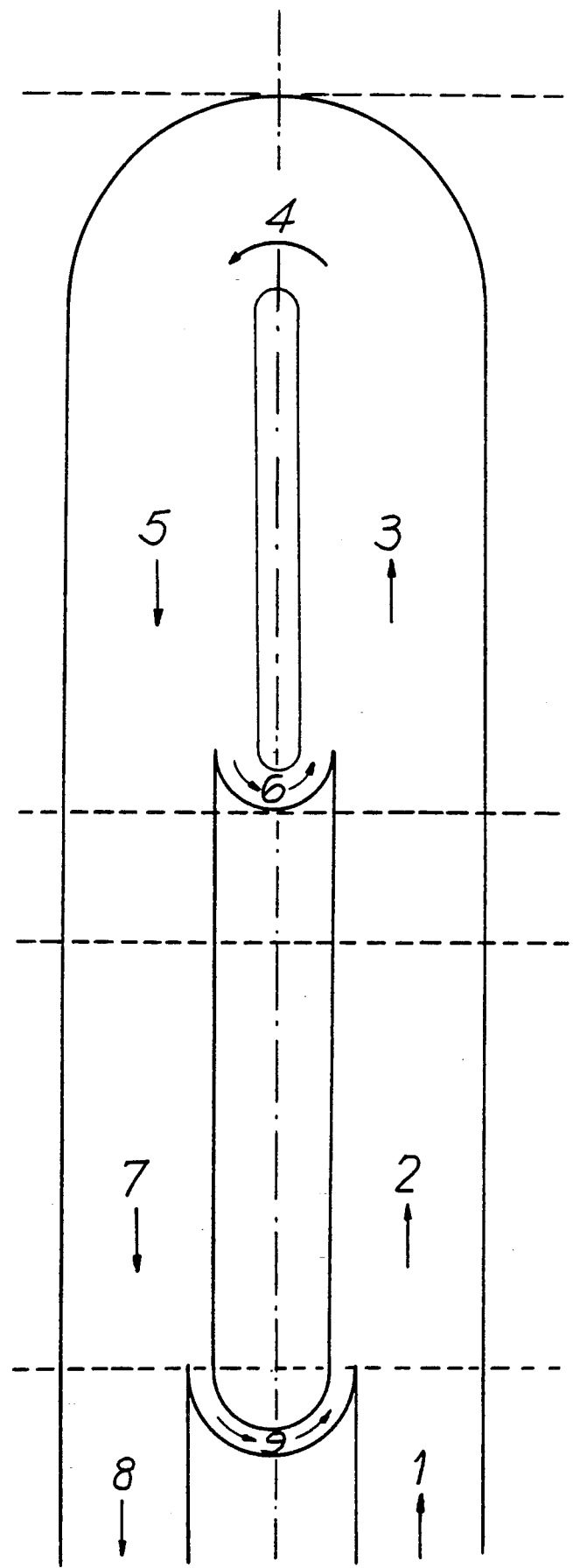

METHOD OF REDUCING THE NITROGEN DIOXIDE CONTENT OF FLUE GAS FROM A COKE OVEN WITH DUAL HEATING FLUES BY A COMBINATION OF EXTERNAL FLUE GAS FEED BACK AND INTERNAL FLUE GAS RECIRCULATION

BACKGROUND OF THE INVENTION

Our invention relates to a method of reducing the $NO_x$-content in flue gas generated on firing a rich gas coke oven or combination coke oven and a coke oven battery for performing that method.

The process of our invention may be applied to a rich gas coke oven or a combination coke oven with heated walls forming dual heating flues, with a single stage or multistage combustion in the dual heating flues and with regeneration for recovery of flue gas heat and preheating of the underfiring media.

The $NO_x$-formation depends among other things on the flame temperature, which is naturally quite high (up to about 3000° C.) because of the high air preheating and because of the high heat content with rich gas during coke oven firing. In coke oven firing with lean gas, because of the lower gas heat content and the greater flue gas generation, lower flame temperatures and thus reduced $NO_x$ concentrations result in the flue gas than with rich gas.

Internal flue gas recirculation has been used for reduction of the $NO_x$-content in the flue gas in a coke oven with dual heating flues with an upper flue gas circulation turning point and lower connecting opening in a common central wall between the heating flues. In this kind of coke oven the flue gas, which is automatically recirculated inside the dual heating flues, is transported from the downwardly-directed heating flues into the rising heating flues and/or the combustion containing heating flues.

External flue gas feed back, in which flue gas drawn out of the flue is intermixed with the hot gas and/or the combustion air prior to or on admission to the oven, has also been known and utilized.

Both known methods using internal and external flue gas recirculation up to now have been only used independently of each other.

External flue gas recirculation requires several additional measures: Blowers for the flue gas and if necessary also air return ducts, a feed and distribution system with control and regulatory devices, greater regenerators, increased underfiring and additional flow requirements. Because of the increased investment and operating costs the external flue gas recirculation has almost no practical importance. The internal recirculation method in contrast is not burdened with its disadvantages and thus finds greater use. Both processes have specific limitations in regard to their attainable feed back rate. However external flue gas recirculation has a greater cooling action than internal flue gas recirculation, when the two methods are compared at the same flue gas flow rates, because the admission temperature into the fired heating flues is somewhat lower in the case of external flue gas recirculation.

SUMMARY OF THE INVENTION

It is an object of our invention to provide a method for reducing the $NO_x$-formation in the flue gas of a coke oven with less expense and effort than is possible with any of the known method, especially for rich gas operation.

In keeping with this object and with others which will become more readily apparent hereinafter, one portion of the waste or flue gas drawn out of the one flue of the dual heating flues is admixed with underfiring media, gas and/or air, prior to or during admission to the other flue of the dual heating flues and additionally another portion of the flue gas is recirculated inside the dual heating flues.

Because of the inventive combination of the external and internal flue gas recirculation, a decrease of the flame temperature of a size not previously possible with either process alone is attained. As a result of this decrease of flame temperature, the $NO_x$-formation is substantially reduced in the coke oven, especially when underfiring with rich gas, without impairing the oven output. The combination allows a desirable increase in mixing rate and a noteworthy reduction in investment cost and operating cost in contrast to external flue gas feed back alone.

The invention provides that combustion air drawn from the surroundings, especially at emission locations of the coke oven battery, is fed through ducts as forced air. This feature permits an economical combining of removal of coke oven emissions with drawing in of underfiring air.

It is a further feature of our invention that the mass flow of external recycled flue gas is regulated considering the recirculation rate so that a desired flame temperature in the oven is kept constant based on a heat balance in the hot flue. A specific control system is provided for the novel control of flame temperature by a combination of internal and external flue gas recirculation—independent of the flue gas type—which is new in the coke oven engineering field. In this control system the measured combustion parameters of the flow rate, heat content, oxygen concentration and temperatures are determined by a computer, which then generates commands for adjustment of the required flow rates considering the heat requirements and the desired flame temperature.

Further in rich gas firing in the combination oven the externally recirculated flue gas should be fed only to the regenerators, which are loaded with gas during lean gas operation and only to every second regenerator in rich gas operation.

It is further provided that rich gas can be converted to a lean gas by mixing it with external recirculated flue gas and then regenerative preheating can occur. In this operation the rich gas is mixed with a flow of recirculated flue gas so that the heat content of the mixture equals that of the lean gas (2500 to 5200 kJ/Nm$^3$). This "stretched rich gas" and/or "artificial lean gas" is then regeneratively preheated like a "genuine" lean gas and the combustion product is then admitted into the dual heating flues additionally having the recirculation according to our invention. The use of the heating system according to our invention in the combination oven has the advantage that the rich gas distribution system and the injector pipes can be omitted.

According to an additional feature of our invention the changeover intervals in the periodic alternate firings with two or more coke oven batteries are approximately staggered in time and the recirculated flue gas is only drawn out from the flue gas duct of the coke oven batteries, which are being immediately fired. Thus it is guaranteed that during the changeover of the one block and/or at the beginning of a new firing period—instead of flushing air from its own duct—flue gas from one of the other coke oven batteries, which is being immediately fired, is drawn in. This process requires suitable connecting ducts and control members. Also in this process step a portion of the coke oven battery can be heated with rich gas and another portion can be simultaneously heated with lean gas.

Our invention further provides that the ducts of the flue gas fittings or valves of all gas and all air regenerators in the combination coke oven and/or all first and second regenerators in the rich gas oven are controlled or regulated separately in sequence so that the regenerators of both series have the same or different flows of flue gas admitted and in all valves the flue gas temperature is the same. For example in the formation of an "artificial lean gas" with increasing mixing rate in the flue gas or its temperature the mixing and/or admission temperature of the lean gas in the regenerator and correspondingly the flue gas temperature of the gas regenerator always increases. To counter this effect the distribution of flue gas flow to the connected gas regenerator and air regenerators is not in the usual 50%/50% ratio, but in a ratio such that the outlet temperatures are equal.

In another embodiment of our invention the flow regulation of the regenerator series is controlled so that unequal flue gas temperatures exist at their valves and only the flue gas flow from the regenerator at the lower temperature is used for the external flue gas recirculation. This embodiment can be more advantageous than the foregoing depending on the operating conditions, particularly underfiring can be made more economical.

The coke oven battery of coke ovens for performing the process according to our invention having heating walls forming dual heating flues, in which a single stage or multistage combustion occurs, and also having regenerators for the recovery of flue gas heat and preheating the underfiring media is equipped with means for external flue gas feed back or recirculation, such as blowers, suction and distribution ducts, throttling and shut off valves, measurement and regulation devices. Further the central connecting walls of the dual heating ducts are provided with returns located in their upper portion and one or more openings in their lower portion in the vicinity of the heating flue bottom, through which flue gas flows from the downwardly directed or falling heating flue into the rising and/or combustion-containing heating flues.

The dual heating flues made from the heating walls of the rich gas coke oven or combined coke oven can be constructed so that they are fired alternatingly or at the same time. The coke oven battery is provided with known mixing devices, for example Venturi-mixers, convection mixing units, mixing ducts of sufficient length and conjoining guides required for rapid mixing.

The coke oven battery according to our invention is further equipped with a control system for keeping constant a desired predetermined value of the flame temperature by a combined internal and external flue gas feed back, independent of the nature of the flue gas. The present instantaneous flame temperature is determined by a computer from required measured combustion parameters, especially flow rates, heat content, oxygen concentration and temperatures, and commands are issued by the computer for adjustment of the flow rates as required considering the predetermined set value of the flame temperature and the heat requirements.

The coke oven battery according to our invention is equipped further with a measurement and regulation system, which detects the average flue gas temperature and the average draw at the odd or even numbered regenerators, which are supplied with gas or air in lean gas operation, and according to a predetermined plan sets equal or unequal flue gas temperature at both regenerators by control of the draw.

Finally it is still provided that the series of even numbered or odd numbered regenerators and/or of regenerators supplied with gas or air are connected to separate flue gas ducts.

BRIEF DESCRIPTION OF THE DRAWING

The objects, features and advantages of the present invention will now be illustrated in more detail by reference to the accompanying drawing in which:

FIG. 1, the sole FIGURE, is a schematic diagram of the flow of flue gas in a coke oven with rich gas firing.

Referring the sole figure the process of our invention can be better understood with reference to a rich gas firing of a coke oven. In the process of the invention the inflow at reference number 1 represents combustion air being drawn in. The flow indicated by the reference number 2 represents the flow of a mixture of combustion air with an externally recirculated portion of the flue gas, which is being heated in a regenerator. Note that the portion of the flue gas external recirculated occurs before admission to the heating flue at 3. The number 3 indicates flow in the heating flue in which combustion is taking place and the flow there is a mixture of internally and externally recirculated flue gas as well as combustible gas and combustion air. The reference number 4 indicates flow from the upper portion of the heating flue in which combustion is taking place into the heating flue in which the flowing gases are falling. The flow occurs through a connecting hole or port in the central wall dividing the flues. The reference number 6 indicates fed back internally recirculated flue gas flowing from the downwardly directed flue to the flue in which the upwardly flowing combusting gases are located. The flow at reference number 7 represents descending heated flue gas which passes through the regenerator supplying heat to the rising combustion air. Reference number 8 indicates the discharge of exhaust or flue gas from the regenerator, while 9 represents the another portion of the flue gas recirculated externally.

It will be understood that each of the elements described above, or two or more together, may also find a useful application in other types of structures differing from the types described above.

While the invention has been illustrated and described as embodied in a coke oven battery and a method for reducing the nitrogen oxides in coke oven flue gas generated on firing of a rich gas coke oven or a combination coke oven, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims.

We claim:

1. In a method of reducing a nitrogen oxides content of a flue gas generated on firing of a rich gas or combination coke oven, said coke oven having a plurality of heating walls forming dual heating flues, in which a single stage or multistage combustion takes place, and said coke oven also having a plurality of regenerators for recovery of flue gas heat and preheating of an underfiring medium, the improvement comprising the steps of mixing one portion of said flue gas drawn from one flue of said dual heating flues with said underfiring medium not after admission to the other flue of said dual heating flues, recirculating another portion of said flue gas additionally inside said dual heating flues, recirculating externally at a predetermined flow rate said one portion of said flue gas and controlling said recirculating externally said one portion of said flue gas so that a flame temperature in said heating flues is kept constant based on a heat balance in said heating flues, and feeding, during rich gas firing of said coke oven, said one portion of said flue gas recirculated externally only to those of said regenerators, which receive said underfiring media during lean gas operation, and, during rich gas operation, only to every second one of said regenerators.

2. The improvement defined in claim 1, wherein said underfiring medium includes one gas, and further comprising converting said one gas into another gas, which is leaner compared to said one gas, by mixing said one gas with a further portion of flue gas, which is externally recirculated, and regeneratively preheating said another gas.

3. In a method of operating a plurality of coke oven batteries, each of said coke oven batteries having a plurality of said coke ovens and being operated according to claim 2, said method of operating said plurality of coke oven batteries including periodic alternate firings in a number of said coke oven batteries, said periodic alternate firings having changeover intervals, the improvement comprising approximately staggering the changeover intervals in time in said periodic alternative firings in a number of said coke oven batteries and only drawing out said one portion of said recirculated flue gas from a plurality of flue gas ducts of said coke oven batteries, which are being immediately fired.

4. The improvement defined in claim 1, wherein said regenerators are provided with a plurality of flue gas valves and further comprising controlling separately a draw in each of said flue gas valves of said regenerators in said combination coke oven or all first and second regenerators in said rich gas coke oven in sequence, so that said regenerators are regulated so that all of said flue gas valves are at a flue gas temperature which is the same.

5. The improvement defined in claim 1, wherein said regenerators have a plurality of valves and further comprising adjusting a draw regulation of said regenerators, so that said valves are at unequal flue gas temperatures and using only said flue gas with a lower one of said flue gas temperatures as said one portion of said flue gas externally recirculated.

* * * * *